(12) United States Patent
Brick

(10) Patent No.: US 7,637,050 B2
(45) Date of Patent: Dec. 29, 2009

(54) FISHING LURE

(75) Inventor: Derek Ross Brick, Ozark, MO (US)

(73) Assignee: Slog, LLC, Ozark, MO (US)

( * ) Notice: Subject to any disclaimer, the term of this patent is extended or adjusted under 35 U.S.C. 154(b) by 60 days.

(21) Appl. No.: 11/868,460

(22) Filed: Oct. 5, 2007

(65) Prior Publication Data
US 2009/0090041 A1    Apr. 9, 2009

(51) Int. Cl.
*A01K 85/00* (2006.01)
(52) U.S. Cl. .................. 43/42.47; 43/42.09; 43/42.24; 43/42.35; 43/42.36
(58) Field of Classification Search .............. 43/42.47, 43/42.24, 42.26, 42.28, 42.09, 42.43, 42.39, 43/42.08, 42.35, 42.36
See application file for complete search history.

(56) References Cited

U.S. PATENT DOCUMENTS

| | | | | |
|---|---|---|---|---|
| 1,133,669 | A * | 3/1915 | Reynolds | 43/42.47 |
| 1,233,507 | A * | 7/1917 | Reynolds | 43/42.47 |
| 1,334,249 | A * | 3/1920 | Lane | 43/42.47 |
| 1,341,618 | A * | 5/1920 | Medley | 43/42.47 |
| 1,352,054 | A * | 9/1920 | Dills | 43/42.47 |
| 1,452,359 | A * | 4/1923 | Cass | 43/42.47 |
| 1,600,653 | A * | 9/1926 | Steenstrup | 43/42.47 |
| 1,644,151 | A * | 10/1927 | Rodgers | 43/42.47 |
| 1,700,061 | A * | 1/1929 | Kimmich | 43/42.47 |
| 1,701,528 | A * | 2/1929 | Clewell | 43/42.36 |
| 1,832,172 | A * | 11/1931 | Winter | 43/42.47 |
| 1,927,441 | A * | 9/1933 | Korte | 43/42.47 |
| 1,981,091 | A * | 11/1934 | Clark | 43/42.47 |
| 1,997,900 | A * | 4/1935 | Edwards | 43/42.47 |
| 2,025,270 | A * | 12/1935 | Chaney | 43/42.47 |
| 2,102,492 | A * | 12/1937 | Stolley | 43/42.36 |
| 2,103,994 | A * | 12/1937 | Verzi | 43/42.47 |
| 2,183,059 | A * | 12/1939 | Bacon | 43/42.24 |
| 2,183,849 | A * | 12/1939 | Swanberg | 43/42.43 |
| 2,200,670 | A * | 5/1940 | Hargrett | 43/42.47 |
| 2,235,597 | A * | 3/1941 | Winter | 43/42.47 |
| 2,290,433 | A * | 7/1942 | Jeffers | 43/42.36 |
| 2,290,702 | A * | 7/1942 | Nelson | 43/42.36 |
| 2,375,290 | A * | 5/1945 | Docteur | 43/42.36 |
| 2,461,755 | A * | 2/1949 | Miller | 43/42.36 |
| 2,496,231 | A * | 1/1950 | Phippen | 43/42.47 |
| 2,517,962 | A * | 8/1950 | Bastie | 43/42.43 |
| 2,522,179 | A * | 9/1950 | Jensen, Sr. et al. | 43/42.36 |
| 2,538,171 | A * | 1/1951 | Stroup et al. | 43/42.47 |
| 2,556,533 | A * | 6/1951 | Graaten | 43/42.15 |
| 2,663,112 | A * | 12/1953 | McMillin | 43/42.09 |
| 2,690,026 | A * | 9/1954 | King | 43/42.36 |
| 2,698,494 | A * | 1/1955 | Larsen | 43/42.36 |

(Continued)

*Primary Examiner*—Darren W Ark

(57) ABSTRACT

A fishing lure shaped like a snake that mimics the undulating, swimming action of a snake. It incorporates this original action into an extremely versatile lure specifically designed to be fished on water's surface, under water's surface, diving, bouncing around on floor bottom, and swimming back up to surface simply by adjusting rod position/retrieval speed. Furthermore, consisting of not only replaceable (soft plastic) snake bodies, but replaceable (soft plastic) lizard bodies and replaceable (soft plastic) frog bodies as well that all attach to the same hard plastic head and neck via a snap-on/squeeze-off connection. Furthermore, it's design enables each body to have it's own swimming action. The snake body, aforementioned, undulates like a real snake swimming. The lizard body wiggles and sways like a real lizard swimming. And the frog body wobbles and kicks it's legs like a real frog swimming.

1 Claim, 3 Drawing Sheets

U.S. PATENT DOCUMENTS

| | | | | |
|---|---|---|---|---|
| 2,791,859 A * | 5/1957 | Wentworth | | 43/42.47 |
| 2,793,461 A * | 5/1957 | Korte | | 43/42.47 |
| 2,812,609 A * | 11/1957 | Lema | | 43/42.28 |
| 2,847,791 A * | 8/1958 | Simmons | | 43/42.36 |
| 2,931,123 A * | 4/1960 | Jensen, Jr. | | 43/42.36 |
| 2,945,318 A * | 7/1960 | Lassiter | | 43/42.47 |
| 2,950,560 A * | 8/1960 | Worden | | 43/42.36 |
| 2,951,308 A * | 9/1960 | Kent | | 43/42.36 |
| 2,958,152 A * | 11/1960 | Kyper | | 43/42.47 |
| 3,096,597 A * | 7/1963 | Dickinson | | 43/42.36 |
| 3,137,960 A * | 6/1964 | Sharp | | 43/42.09 |
| 3,148,474 A * | 9/1964 | Smith | | 43/42.36 |
| 3,174,248 A * | 3/1965 | Hagel | | 43/42.36 |
| 3,218,750 A * | 11/1965 | Lewin | | 43/42.39 |
| 3,462,871 A * | 8/1969 | McVay | | 43/42.47 |
| 3,815,275 A * | 6/1974 | Amundson | | 43/42.47 |
| 3,844,060 A * | 10/1974 | Kurachi | | 43/42.48 |
| 3,861,073 A * | 1/1975 | Thomassin | | 43/42.24 |
| 3,979,853 A * | 9/1976 | Storm et al. | | 43/42.09 |
| 4,183,164 A * | 1/1980 | Young et al. | | 43/42.36 |
| 4,414,772 A * | 11/1983 | Duncan | | 43/42.36 |
| 4,437,257 A * | 3/1984 | Kluge | | 43/42.47 |
| 4,445,294 A * | 5/1984 | Gowing | | 43/42.47 |
| 4,654,995 A * | 4/1987 | Rapelje | | 43/42.24 |
| 4,793,090 A * | 12/1988 | Cooper | | 43/42.43 |
| 4,841,667 A * | 6/1989 | Johns | | 43/42.47 |
| 4,893,431 A * | 1/1990 | Ehlers | | 43/42.47 |
| 4,944,112 A * | 7/1990 | Garmany et al. | | 43/42.47 |
| 4,959,920 A * | 10/1990 | Walker | | 43/42.47 |
| 5,070,639 A * | 12/1991 | Pippert | | 43/42.09 |
| 5,119,581 A * | 6/1992 | Rudolph | | 43/42.47 |
| 5,170,579 A * | 12/1992 | Hollinger | | 43/42.47 |
| 5,301,453 A * | 4/1994 | Terrill | | 43/42.09 |
| 5,351,433 A * | 10/1994 | Ellis | | 43/42.47 |
| 5,381,620 A * | 1/1995 | Gibbs | | 43/42.09 |
| 5,522,170 A * | 6/1996 | Cole | | 43/42.15 |
| 5,524,380 A * | 6/1996 | Hnizdor | | 43/42.47 |
| 5,560,143 A * | 10/1996 | Allen | | 43/42.47 |
| 5,586,405 A * | 12/1996 | Fike | | 43/42.24 |
| 5,815,978 A * | 10/1998 | Huddleston | | 43/42.09 |
| 5,822,912 A * | 10/1998 | Kato et al. | | 43/42.39 |
| 5,911,571 A * | 6/1999 | Wittbrot, III | | 43/42.09 |
| 5,918,405 A * | 7/1999 | Marusak et al. | | 43/42.09 |
| 5,918,406 A * | 7/1999 | Wilson | | 43/42.28 |
| 5,926,993 A * | 7/1999 | Marusak et al. | | 43/42.09 |
| 5,946,848 A * | 9/1999 | Ysteboe et al. | | 43/42.47 |
| 6,058,643 A * | 5/2000 | Marusak et al. | | 43/42.09 |
| 6,141,900 A * | 11/2000 | Rudolph | | 43/42.47 |
| 6,164,006 A * | 12/2000 | Peterson | | 43/42.24 |
| 6,192,618 B1 * | 2/2001 | Wackerman | | 43/42.15 |
| 6,230,433 B1 * | 5/2001 | Nichols | | 43/42.39 |
| 6,484,434 B1 * | 11/2002 | Elges | | 43/42.47 |
| 6,560,915 B2 * | 5/2003 | Downey | | 43/42.39 |
| 6,618,979 B2 * | 9/2003 | Wacha | | 43/42.47 |
| 6,647,660 B1 * | 11/2003 | Kruger | | 43/42.53 |
| 6,671,996 B1 * | 1/2004 | Ito | | 43/42.39 |
| 6,912,808 B1 * | 7/2005 | Mak | | 43/42.47 |
| 7,076,911 B2 * | 7/2006 | Thorne | | 43/42.26 |
| 7,107,719 B2 * | 9/2006 | Scott | | 43/42.09 |
| 7,197,846 B1 * | 4/2007 | Gibson | | 43/42.08 |
| 7,263,798 B2 * | 9/2007 | Nichols | | 43/42.09 |
| 7,497,046 B1 * | 3/2009 | Jefferson | | 43/42.24 |
| 2006/0096154 A1* | 5/2006 | Meroney | | 43/42.47 |
| 2006/0107582 A1* | 5/2006 | Leppala et al. | | 43/42.47 |
| 2006/0191186 A1* | 8/2006 | Perrick | | 43/42.47 |
| 2006/0236588 A1* | 10/2006 | Rapelje | | 43/42.09 |
| 2007/0101636 A1* | 5/2007 | Dolence et al. | | 43/42.47 |
| 2007/0175083 A1* | 8/2007 | Wilson et al. | | 43/42.24 |
| 2008/0209793 A1* | 9/2008 | Ciotlos | | 43/42.09 |
| 2008/0222939 A1* | 9/2008 | Smith et al. | | 43/42.09 |
| 2008/0271358 A1* | 11/2008 | Meroney | | 43/42.24 |
| 2009/0064564 A1* | 3/2009 | Ingram | | 43/42.47 |

* cited by examiner

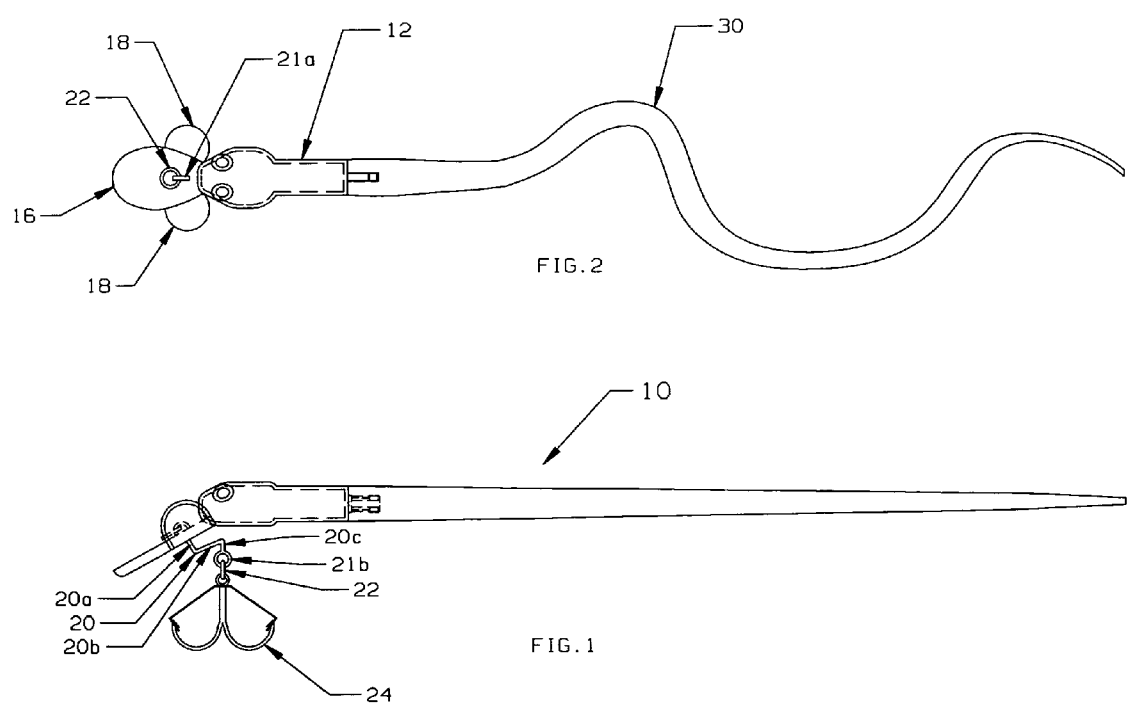

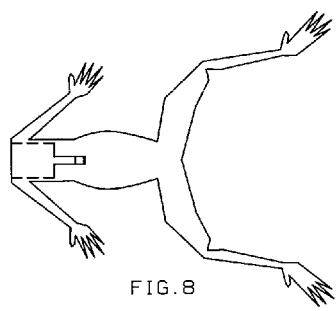
FIG. 8
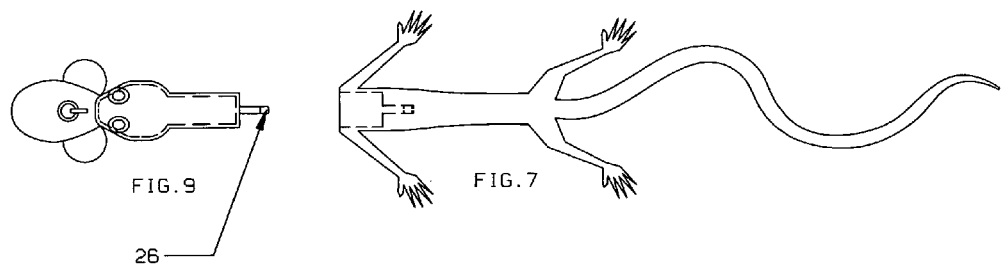
FIG. 9
FIG. 7
26
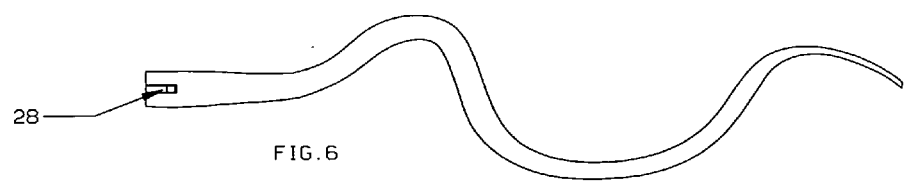
28
FIG. 6

FISHING LURE

SUMMARY OF THE INVENTION

It is a principal object of the invention to provide a fishing lure in the shape of a snake that mimics exactly the live, swimming action of a snake, of which has never been done before. In addition, it incorporates this original action into an extremely versatile lure specifically designed so it can be fished on top of the water's surface, just under the water's surface, as a diving lure, a lure that bounces around on the floor bottom, and a lure that swims back up to the surface simply by adjusting rod position and retrieval speed. The lure can be fished so diversely because of the way it is designed. First of all, the entire lure is buoyant at standstill. The shape, size and angle of the diving/wobble lip and wobble wings as well as the specific location and size of the weed less treble hook eyelet and one-piece tie on rod enables the lure to have the widest possible wobble of the head and neck which causes the soft plastic body to undulate which in turn causes the entire lure to mimic exactly the live, swimming action of a snake. Also, the fact that the weed less treble hook hangs down acting like a weighted, mobile axis for the wobble gives it a unique swaying (rolling) motion in addition to the wide wobble. Not only is the placement of the weed less treble hook crucial to it's swimming action, it's also perfectly placed due to the fact that 95% of all fish strikes are struck at the head. And it suspends down a specific distance from the lure so it can easily hook the fish that strike at it. Obviously, the weed less treble hook itself keeps the lure from getting snagged and enables the lure to be fished just about anywhere.

The lure can be fished on top of the water's surface with a very slow retrieval and rod tip pointed straight up in the sky. The undulating motion of the lure on the water's surface makes a very enticing commotion for Bass and all other game fish. The lure can be fished bouncing off the floor bottom with a fast retrieval and rod tip pointed down towards the water. This also makes for a very enticing commotion on the floor bottom. From this position, the lure can be swum up to the surface simply by slowing down the retrieval and pointing the rod tip straight up into the sky. All the other mentioned ways of fishing this lure can be done with slight variations of these two. Swimming the lure just under the surface can make for a very smooth undulating motion by retrieving slowly with the rod tip pointed at approximately a 75-degree angle from the water's surface. The user can make the lure dive by pointing the rod tip out parallel with the water's surface while retrieving at a medium speed. Adding an occasional pause in retrieval to all of the methods of swimming this lure can add to the enticing effect for the game fish.

It is a further object of the invention to provide a fishing lure that is essentially three lures in one. Since the head and neck of snakes, lizards and frogs are so similar this lure will not only have replaceable snake bodies, but it will have replaceable lizard bodies and replaceable frog bodies as well that will all attach to the same hard plastic head and neck. This will enable increased versatility. For example, when a fisherman is retrieving the lure as a snake and misses a strike, said fisherman can quickly swap out the snake body for a frog body and cast back to the same place and has greatly increased the odds of getting another strike from that same fish. Furthermore, the shape and design of the soft plastic bodies enables each of the three bodies to have their own, unique and original swimming motion that mimics exactly the real thing. The snake body, as mentioned, undulates just like how a real snake swims. The lizard body wiggles and sways just like how a real lizard swims. And the frog body wobbles and kicks it's legs just like how a real frog swims.

This lure can be made fairly simply and inexpensively. The hard plastic head and neck can be made out of mold injected hard, buoyant plastic. The diving/wobble lip and wobble wings can be cut out of common Plexiglas and secured to the head or it can be made as part of the hard plastic head and neck using only one mold. The one-piece tie on rod will be made out of metal rod and will be added adhesively at assembly or will be placed in the mold just prior to hard plastic injection if it is made as an actual part of the hard plastic head and neck. The replaceable soft plastic bodies will be injection molded onto a hard plastic snap on/squeeze off connection attachment that enables the soft plastic bodies to be easily replaced via the snap on/squeeze off connector. It is designed in such a manner that the soft plastic body butts right up against the hard neck of the head making it appear as it if is one piece, a whole snake. The soft plastic bodies of the lizard and frog will extend up past the end of the female snap on/squeeze off connector. And thus when connected, the arms of the lizard and frog will be closer to the head, making it very realistic.

The body of the lure can be painted and dyed with "glow in the dark" vivid colors that enable it to stand out and to be seen easily in darker waters or in darker areas like under brush and overhangs and under and around boat docks, etc. This will also enable this lure to be a very effective fishing lure at night.

BRIEF DESCRIPTION OF THE DRAWINGS

The present drawing may be more readily described with reference to the accompanying drawings, in which:

FIG. 1 is a side view of the fishing lure in accordance with the present invention.

FIG. 2 is a top view of the fishing lure of FIG. 1.

FIG. 6, FIG. 7, and FIG. 8 are top views of the lure showing preferred soft plastic bodies standing freely not connected to the hollow, hard plastic head and neck.

FIG. 9 is a top view of said lure showing the hollow, hard plastic head and neck standing freely not connected to preferred soft plastic bodies.

DETAILED DESCRIPTION

Figure 5:
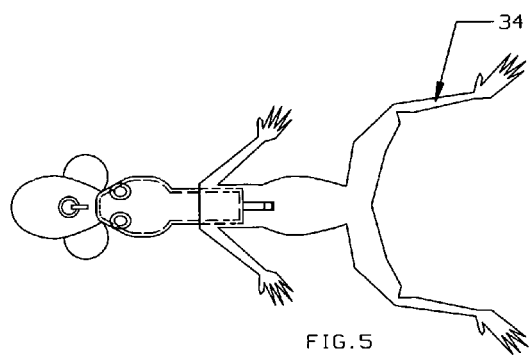
FIG. 3, FIG. 4, and FIG. 5 are top views of the lure showing preferred soft plastic bodies connected to a hollow, hard plastic head and neck.
Figure 4:
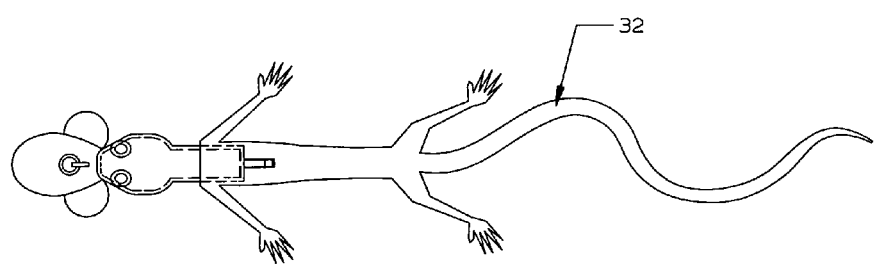
Figure 3:
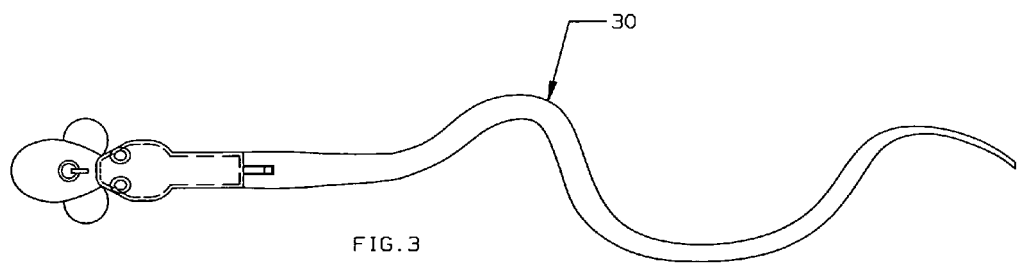

Referring to the Figures, a fishing lure in accordance with the present invention is shown at 10. Lure 10 includes a hollow, hard plastic head and neck 12 molded from a lightweight buoyant hard plastic to resemble, externally, the head and neck of a snake/frog/lizard. For ease of assembly, hard plastic head and neck 12 may be made with abutting, upper and lower halves (not shown) that are adhesively sealed together.

Diving/wobble lip 16 is flat, has a specific size and shape and extends from hard plastic head and neck 12 at a specific angle and may be made as part of hard plastic head and neck 12 from the same material or added later at assembly and made of common Plexiglas or comparable material. Wobble wings 18 are flat, have a specific size and shape and each extend both upwardly at an angle to and out from diving/wobble lip 16 as shown in FIG. 1 and FIG. 2 and will be made out of the same material as diving/wobble lip 16 as they are one piece.

One piece tie on rod 20 with known split rings 22 attached on each end extends through said diving/wobble lip 16 and may be secured to said diving/wobble lip 16 as part of the mold or may be adhesively added at assembly. The tie on rod 20 has a first section 20a that both has a first eyelet 21a attached to one of the split rings 22 for attachment to the line and extends through the lip 16, a second section 20b that extends rearwardly at an angle from the first section, and a third section 20c that both extends downwardly at an angle from the second section and has a second eyelet 21b attached to the other of the split rings 22 for attachment to the hook 24.

Weed less treble hook 24 suspends from one-piece tie on rod 20 via split ring 22. Split ring 22 on opposite side of one-piece tie on rod 20 is where fishing line is to be tied.

Plastic male snap on/squeeze off connector 26 extends from said hard plastic head and neck 12 and may be made out as part of a mold of the hard plastic head and neck 12 or may be adhesively added at assembly.

Plastic female snap on/squeeze off connector 28 may be molded from a lightweight buoyant plastic. Plastic female snap on/squeeze off connector 28 may be placed in a mold of a soft plastic snake body 30/soft plastic lizard body 32/soft plastic frog body 34 as they are poured so as to securely fasten together. Or plastic female snap on/squeeze off connector 28 may be adhesively connected to the inside of soft plastic snake body 30/soft plastic lizard body 32/soft plastic frog body 34 at assembly.

Soft plastic snake body 30 is to be molded from a lightweight buoyant soft plastic to resemble, externally, that of a snake body. Soft plastic lizard body 32 is to be molded from the lightweight buoyant soft plastic to resemble, externally, that of a lizard body. Soft plastic frog body 34 is to be molded from the lightweight buoyant soft plastic to resemble, externally, that of a frog body.

While the invention has been described with a high degree of particularity, it will be appreciated by those skilled in the art that modifications may be made thereto. For example, the body of the lure need not be made strictly in the shape of a snake/lizard/frog but may be provided with any desired configuration as well. Therefore, it is to be understood that the present invention is not limited to the sole creature bodies described above, but encompasses any and all creature bodies within the scope of the following claims.

I claim:
1. A fishing lure comprising:
   a hollow, hard plastic head and neck;
   a flat diving/wobble lip that extends downwardly from said hard plastic head and neck in a single plane at an angle relative to a longitudinal axis of said head and neck, said diving/wobble lip defining an outer circumferential edge along an outer periphery of said diving/wobble lip;
   a flat first wobble wing extending from said outer circumferential edge on one side of said diving/wobble lip, said first wobble wing both extending upwardly at an angle relative to said single plane and having a rounded outer edge;
   a flat second wobble wing extending from said outer circumferential edge on the other opposing side of said diving/wobble lip, said second wobble wing both extending upwardly at an angle relative to said single plane and having a rounded outer edge;
   a one piece tie on rod with eyelets attached on opposed ends thereof, said tie one rod extending through said diving/wobble lip;
   a first eyelet of said eyelets attached on opposed ends of said one piece tie on rod extending from one end of said opposed ends of said one piece tie on rod for tying line on, said first eyelet being located above said diving/wobble lip; and
   a second eyelet of said eyelets attached on opposed ends of said one piece tie on rod extending from the other end of said opposed ends of said one piece tie on rod for securing a weed less treble hook that acts as a balance weight/pivotal axis from which said hard plastic head and neck wobbles/rolls, said second eyelet being located below said diving/wobble lip,
   wherein said one piece tie on rod has three sections comprising a first section both having said first eyelet thereon and extending through said diving/wobble lip, a second section extending rearwardly at an angle from said first section, and a third section both extending downwardly at an angle from said second section and having said second eyelet thereon.

\* \* \* \* \*